No. 741,888. Patented October 20, 1903.

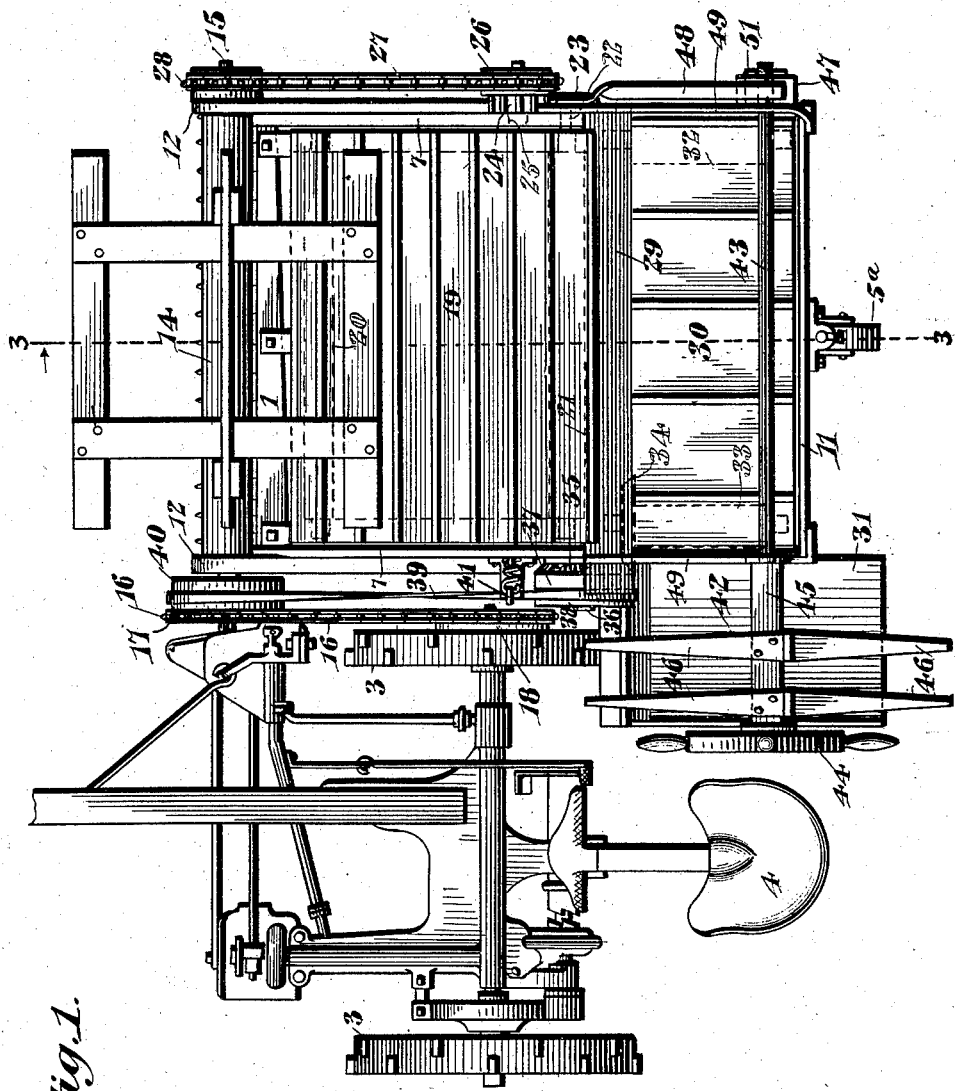

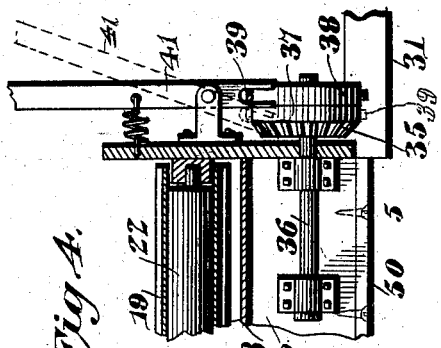

UNITED STATES PATENT OFFICE.

LEANDER CLARK, OF GREENVILLE, OHIO.

ATTACHMENT FOR MOWERS.

SPECIFICATION forming part of Letters Patent No. 741,888, dated October 20, 1903.

Application filed May 29, 1902. Serial No. 109,571. (No model.)

*To all whom it may concern:*

Be it known that I, LEANDER CLARK, a citizen of the United States, residing at Greenville, in the county of Darke and State of Ohio, have invented a new and useful Attachment for Mowers, of which the following is a specification.

This invention relates to an attachment for agricultural implements of that class known as "mowers," and has for its object to provide an attachment capable of being connected to ordinary types of mowing-machines and arranged to deposit flax, clover, or the like harvested by the machine in loose shocks or bunches.

A further object of the invention is to produce a novel form of dumping mechanism constituting a feature of the attachment and located in close proximity to the driver's seat of the mower for manual actuation by the driver to dump the shocks or bunches previously accumulated at the point of discharge.

A still further object of the invention is to equip the attachment with means whereby a lateral conveyer designed to receive the cut clover or flax from the main apron may be thrown into or out of gear, so that the harvested material may be fed continuously to the dumping-platform or may be accumulated upon the lateral conveyer and delivered therefrom at intervals, as desired.

Further and subordinate objects of the invention and other structural features thereof will appear during the course of the succeeding description of that form of my invention which for the purposes of this disclosure is illustrated in the accompanying drawings and embraced within the scope of the appended claims.

In said drawings, Figure 1 is a plan view of a mowing-machine equipped with my attachment. Fig. 2 is a side elevation of the attachment complete, the finger and cutter bars of the mower being shown in section. Fig. 3 is a sectional view on the line 3 3 of Fig. 1. Fig. 4 is a sectional elevation on the line 4 4 of Fig. 2, and Fig. 5 is an elevation of the rear portion of the attachment looking from the side opposite to that shown in Fig. 2. Like numerals of reference are employed to designate corresponding parts throughout the views.

The mowing-machine (shown in plan in Fig. 1) is of ordinary type and includes, as usual, the finger-bar 1, cutter-bar 2, carrying-wheels 3, and driver's seat 4. The collecting and bunching attachment is located in rear of the finger-bar to receive the flax or clover as it is cut and to convey it to the rear of the machine, where it is accumulated in bunches or shocks and dumped at intervals during the advance of the mower across the field. The attachment comprises a frame 5, provided at its front end with clips 6 or other means of attachment to the finger-bar, which supports the front end of the device and insures its movement with the mower, the rear end of the frame being supported by a vertically-adjustable caster-wheel $5^a$. The frame 5 is composed of the side boards 7, between which is located the upwardly-inclined front section 8 of the bottom wall of the frame. This front section 8, which is upwardly inclined from a point immediately adjacent to the finger-bar of the mower, is supported at its rear end by a wall 9, slightly inclined from the vertical and disposed at the front edge of the back section 10 of the frame-bottom. The back section 10 of the bottom wall is located substantially in the horizontal plane of the finger-bar and in rear of the elevated rear end of the front section 8 to define a trough-like receiver, the rear end wall 11 of which constitutes the back wall of the frame and rises from the rear edge of the back section 10 of the bottom.

Extending forwardly from the side boards 7 are a pair of reel-supporting arms 12, braced by suitable braces 13 and designed to rotatably support at a point above the cutter-bar a reel 14, whose shaft 15 is journaled in suitable bearings in the arms 12 and is driven from one of the carrying-wheels 3 of the mower. The manner of gearing the reel to the mower is not material, but is preferably effected through the medium of a sprocket-chain 16, operatively connecting sprocket-wheels 17 and 18, mounted on the reel-shaft 15 and on one of the carrying-wheels 3, respectively.

The reel 14 may be of any suitable construction and is designed to be rotated by the advance of the mower for the purpose of throwing the cut clover or flax back upon an endless apron 19, having the usual transverse slats, as shown, and passed around horizontal rollers 20 and 21, disposed between the side boards 7 of the frame, adjacent to the front and rear ends thereof. The apron 19 is upwardly inclined, as shown, in correspondence with the front section 8 of the bottom wall and is driven from the reel-shaft 15 by means of any approved form of gearing. By preference, however, the shaft 22 of the roller 21 is extended through the outer side board 7 and is provided with a gear-wheel 23, meshing with a similar gear-wheel 24, mounted on a stud-shaft 25, projecting from the side board. Connected to the gear-wheel 24 for rotation therewith is a sprocket-wheel 26, geared by means of a sprocket-chain 27 to a sprocket-wheel 28, keyed or otherwise fixed upon the reel-shaft 15 at the end thereof opposite the gearing connecting said shaft with the carrying-wheel of the mower. This form of gearing effects the driving of the roller 21 from the reel-shaft, but in a direction opposite to the direction of rotation of the reel. This is necessary in order to secure the rearward movement of the upper run of the apron 19, so that the harvested material thrown back upon said apron by the reel will be carried rearwardly by the apron and deposited in the trough-like receiver at the rear end of the frame. The material discharged from the rear end of the apron drops upon an inclined delivery-board 29 and gravitates down the same to an endless lateral conveyer 30, located just above the back section 10 of the bottom wall and designed to travel in a direction transverse to the frame for the purpose of delivering the harvested material to a platform 31, located beyond the inner side of the frame at the rear end thereof and upon which the material is designed to accumulate preparatory to the dumping thereof in loose shocks or bundles.

The lateral conveyer 30 is in the form of an endless slatted belt carried by rollers 32 and 33, journaled in suitable bearings, as shown. The shaft of the roller 33 is extended beyond one side of the conveyer and is provided with a beveled gear-wheel 34, meshing with a similar beveled gear-wheel 35, keyed upon a stud-shaft 36, journaled in suitable bearings carried by the wall 9, as shown in Figs. 3 and 4. The shaft 36 is provided with a fixed belt-pulley 37, preferably formed integral with the gear-wheel 35, and upon said shaft is also mounted a loose pulley 38. Ordinarily the shaft 36 is geared to the reel-shaft 15 by a crossed belt 39, passed around the fixed pulley 37 and around a similar belt-pulley 40, keyed upon the reel-shaft, as shown in Fig. 1. The operation of the lateral conveyer is controlled by a belt-shifting lever 41, arranged at the inner side of the frame of the attachment within convenient reach of the driver of the mower, so that when desired the belt may be shifted to the loose pulley 38 and the lateral conveyer thereby thrown out of gear.

We have now seen that the clover, flax, or the like harvested by the mower will be thrown back by the reel 14 from the rearwardly-moving apron 19, from the upper end of which the harvested material will be discharged upon the lateral conveyer, which will under ordinary circumstances continuously feed the material to the platform 31, where it will accumulate preparatory to being dumped from the rear of the machine. The provision of this platform and of novel dumping mechanism disposed for convenient manual actuation by the driver constitutes the most distinctive and perhaps the most important feature of the invention, since one of the primary objects thereof is to insure the continuous conveyance of the material to the rear of the machine and to facilitate the dumping of the accumulated material at the proper intervals by the driver.

It will be noted by reference to Fig. 1 that the platform 31 is located at one side of the driver's seat, but closely adjacent to the ground. This location of the support whereon the harvested material is accumulated enables me to utilize for the dumping of the material a rotary dumping device or reel 42, arranged above the platform to discharge the bunches or loose shocks of clover therefrom and carried by a shaft 43, upon the inner end of which is keyed a hand-wheel 44, arranged closely adjacent to the driver's seat, so that the driver is enabled to conveniently operate the dumping-reel to dump the bunches or shocks whenever the accumulation of material upon the platform 31 necessitates such action. The dumping-reel 42 comprises a square hub 45, from which extend tangential arms 46, paired as shown in Fig. 1. It will thus be observed that in order to clear the platform of accumulated material it is simply necessary to impart a partial rotation to the dumping-reel. The inadvertent rearward rotation of the dumping-reel 42 is prevented by means of a check-wheel 47, keyed upon the outer end of the shaft 43 and engaged by a spring pawl or dog 48, secured to one of a pair of straps 49, in which the shaft 43 is afforded bearings.

Briefly the operation of the device is as follows: The advance of the mower across the field will effect the reciprocation of the cutter-bar 2 in the usual manner, and the flax or clover cut thereby will be thrown back upon the apron 19 and conveyed to the lateral conveyer 30. The lateral conveyer moving in a direction at right angles to the movement of the apron will discharge the material upon the platform 31, where it will accumulate. When in the opinion of the driver the accumulation is sufficient, he will operate the hand-wheel 44 to impart a partial rotation to the dumping-reel 42, causing a pair of the arms 46 to dump or discharge the bundle or loose shock of material from the rear end of the platform 31, the entire mechanism with the exception of the dumping-reel being operated by the traction of the mower and said dumping-reel being located within convenient reach of the driver. It is desirable, however, under some circumstances to dispense with the dumping-platform and the dumping-reel, and when necessary these parts may be removed by detaching the bar 50, carrying the platform, from the frame to which it is screwed, as shown in Fig. 4, and by removing the cotter-key 51, which ordinarily prevents the withdrawal of the shaft 43 from its bearings. When the platform and dumping-reel are not in use, the lateral conveyer 30 may be thrown out of gear by the shifting of the belt 39 to the loose pulley 38 until a sufficient quantity of material has been accumulated upon said conveyer, at which time it may be operated to dump the material by shifting the belt to the fixed pulley 39 in an obvious manner.

It is thought that from the foregoing the construction and operation of my attachment will be clearly apparent; but while the illustrated embodiment of the invention is believed at this time to be preferable I do not limit myself to the structural details defined, as, on the contrary, I reserve the right to effect such changes, modifications, and variations of the illustrated structure as may be properly comprehended within the scope of the protection prayed.

What I claim is—

1. In an attachment for mowers, the combination with a frame, a lateral conveyer carried by the frame, and means for depositing the harvested material on the conveyer, of a platform disposed to receive the material from the lateral conveyer and located beyond one side of the frame at the rear end thereof, and a rotary dumping device mounted above the platform to discharge the material rearwardly therefrom.

2. In an attachment for mowers, the combination with an apron for feeding the harvested material rearwardly, of a lateral conveyer receiving the material from the apron, a dumping-platform disposed to receive the material from the lateral conveyer, and a rotary dumping device located above the platform to discharge the material rearwardly therefrom.

3. In an attachment for mowers, the combination with a frame, of a reel and a lateral conveyer located at opposite ends of the frame, an apron arranged to convey the material from the reel to the lateral conveyer, a platform located beyond one end of the lateral conveyer to receive the accumulated material, and a rotary dumping device located above the platform beyond one side of the frame to discharge the material rearwardly therefrom.

4. In an attachment for mowers, the combination with a frame having means for effecting its detachable connection to the mower, of a platform located beyond one side of the frame at the rear end thereof, conveying means carried by the frame for delivering the harvested material to the platform, a rotary dumping device supported by the frame above the platform, and means for operating the dumping device to dump the material rearwardly therefrom.

5. In an attachment for mowers, the combination with a frame having means for detachably connecting it to the finger-bar of a mower, of a reel and a lateral conveyer located at opposite ends of the frame, an endless apron extending between the reel and the conveyer, means for operating the apron and conveyer from the reel, a platform located beyond one end of the lateral conveyer, a rotary dumping device disposed above the platform to discharge the material rearwardly therefrom and having its axis disposed transversely of the frame, and a hand-wheel for operating said dumping device.

6. The combination with a mower including carrying-wheels, a finger-bar and a driver's seat, of a frame having means of detachable connection to the finger-bar, dumping mechanism located at the rear end of the frame, means for conveying the harvested material from the finger-bar to the dumping mechanism, and manually-operated controlling means for said dumping mechanism, said controlling means being located in proximity to the driver's seat.

7. The combination with a mower including carrying-wheels, a finger-bar and a driver's seat, of a frame having means of attachment to the finger-bar, a reel and a lateral conveyer located at opposite ends of the frame, means for conveying the harvested material from the reel to the lateral conveyer, a platform disposed to receive the material from the lateral conveyer, a rotary dumping device located above the platform, and manually-operated actuating means for said dumping device, said means being located closely adjacent to the driver's seat of the mower.

8. The combination with a mower including carrying-wheels, a finger-bar and driver's seat, of a frame having means of attachment to the finger-bar, a reel located at the front end of the frame and geared to one of the carrying-wheels, an endless apron and a lateral conveyer supported by the frame and geared to the reel, a platform located at one side of the frame at the rear end thereof to receive the harvested material from the lateral conveyer, a rotary dumping-reel disposed above the platform to discharge the material rearwardly therefrom, and a hand-wheel connected to the dumping-reel and located adjacent to one side of the driver's seat.

9. In an attachment for mowers, the combination with a frame, a platform located at one side thereof, and means for conveying the harvested material to the platform, of a dumping-reel located above the platform to discharge the material rearwardly therefrom, a check device for preventing the backward movement of the reel, and means for operating said reel.

10. In an attachment for mowers, the combination with a frame, of a platform located beyond one side of the rear end thereof, a transverse shaft having bearings at the opposite sides of the frame, a dumping-reel and a check-wheel carried by the shaft, a spring-check engaging the check-wheel, and a hand-wheel carried by the shaft to facilitate the manual actuation of the dumping-reel.

11. In an attachment for mowers, the combination with a frame, a reel located at one end thereof, and a lateral conveyer at its opposite end, of an endless apron disposed to receive the harvested material from the reel and to convey it back to the conveyer, rollers supporting the apron, reverse gearing located at one side of the frame and connecting the reel to one of the rollers to drive the latter in the opposite direction, independent gearing at the opposite side of the frame, for driving the lateral conveyer from the reel, and means for throwing said lateral conveyer into and out of gear.

In testimony that I claim the foregoing as my own I have hereto affixed my signature in the presence of two witnesses.

LEANDER CLARK.

Witnesses:
  W. N. STUBBS,
  ADAH BEAN BLOSSOM.